United States Patent
Cummings et al.

(10) Patent No.: US 7,549,326 B2
(45) Date of Patent: Jun. 23, 2009

(54) PISTON DELAMINATION TESTING APPARATUS

(75) Inventors: Jill M. Cummings, Bay City, MI (US); Tim A. Watson, Lake, MI (US); William M. Penzer, Byron, MI (US); Gary W. Beemer, Attica, MI (US); Albert J. Black, Swartz Creek, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 103 days.

(21) Appl. No.: 11/671,509

(22) Filed: Feb. 6, 2007

(65) Prior Publication Data

US 2008/0202203 A1 Aug. 28, 2008

(51) Int. Cl.
G01M 15/02 (2006.01)
(52) U.S. Cl. .................................................. 73/114.77
(58) Field of Classification Search .............. 73/114.77, 73/114.78, 115.01, 116.02, 118.02
See application file for complete search history.

(56) References Cited

U.S. PATENT DOCUMENTS

| | | | | |
|---|---|---|---|---|
| 5,313,919 | A * | 5/1994 | Rao et al. ................ | 123/193.4 |
| 6,044,709 | A * | 4/2000 | Briggs et al. .................. | 73/663 |
| 6,817,333 | B2 * | 11/2004 | Wang et al. .............. | 123/193.2 |
| 7,171,936 | B2 * | 2/2007 | Rein et al. ............... | 123/193.4 |
| 2004/0045521 | A1 * | 3/2004 | Wang et al. .............. | 123/193.1 |
| 2005/0087166 | A1 * | 4/2005 | Rein et al. ............... | 123/193.4 |
| 2007/0157799 | A1 * | 7/2007 | Cochran et al. ................ | 92/71 |
| 2008/0163751 | A1 * | 7/2008 | Subramanian et al. ........ | 92/223 |
| 2008/0184879 | A1 * | 8/2008 | LoBiondo et al. ............. | 92/172 |

* cited by examiner

*Primary Examiner*—Eric S McCall
(74) *Attorney, Agent, or Firm*—Fraser Clemens Martin & Miller LLC; J. Douglas Miller

(57) ABSTRACT

A piston testing apparatus is provided including a housing having an inner wall and defining a cavity therethrough; a piston disposed in the housing cavity and having a polymer coating deposited thereon, wherein the polymer coating of the piston contacts the housing inner wall; a connecting rod coupled to the piston; and an actuator coupled to the connecting rod and configured to provide a reciprocating movement of the piston through the cavity. An injection plate for the piston testing apparatus and a method for challenging an adhesion of the polymer coating to the piston are also described.

14 Claims, 2 Drawing Sheets

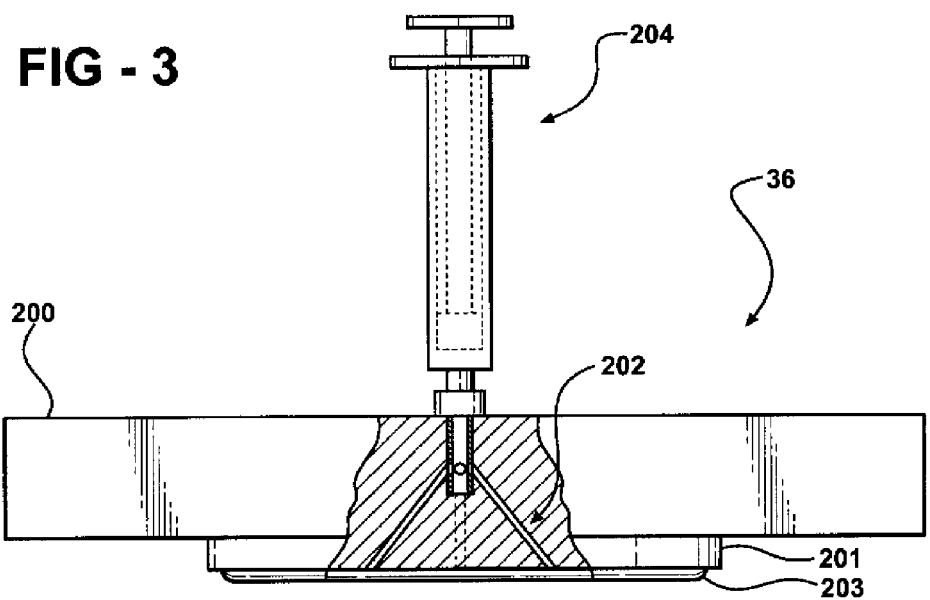
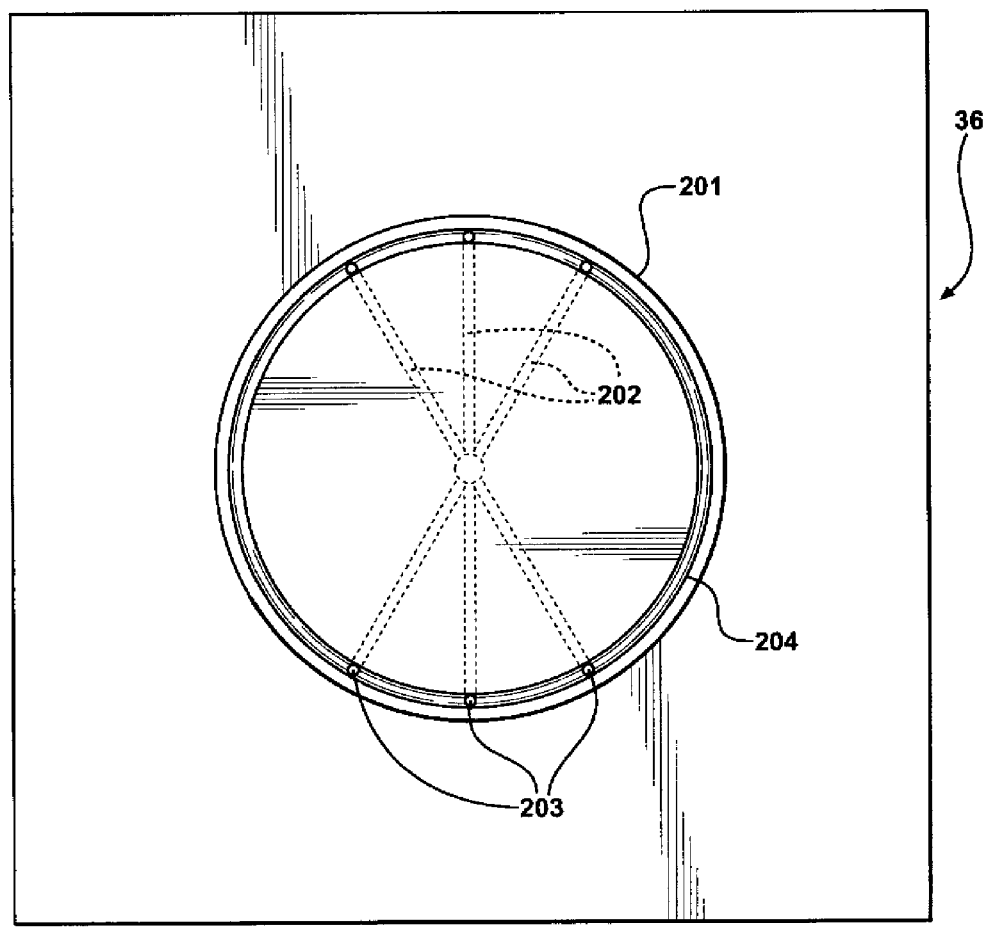

PISTON DELAMINATION TESTING APPARATUS

FIELD OF THE INVENTION

The present disclosure relates to a piston testing apparatus and more particularly to an apparatus for testing the delamination resistance of a piston having a polymer coating.

BACKGROUND OF THE INVENTION

In modern automobile engines, pistons are designed to be relatively quiet under engine operating conditions and are produced with minimum tolerances. Instead of casting or machining the piston to a larger diameter, however, one method for producing such a piston has been to coat a piston skirt surface with a polymer coating. The polymer coating, in addition to any lubricant and piston rings, must withstand the mechanical reciprocation, temperatures, chemical contamination, and pressures that occur during engine operation.

The polymer coating is typically applied to a machined piston surface. Polymers are chosen that facilitate a minimal friction between the piston skirt surface and a cylinder wall. In some instances, however, a coating process can be insufficient or a piston surface can contain an imperfection. As a result, a bubbling or a delamination of the polymer coating from the piston can occur while in engine operation. The delaminated polymer can become a contaminant to the engine by accumulating in the oil. This reduces the engine efficiency and can even lead to an engine seizure An optimum adhesion of the polymer coating to a skirt surface on the piston is therefore desirable.

Screening new polymers, piston materials, and piston designs is expensive and time consuming. Traditional tests have included, for example, a cross-hatch adhesion test (ASTM D-3359), a high temperature engine oil bath test, a high temperature water bath test, and a high pressure oil impingement test. In the oil bath test, pistons are immersed in oil at 325° F. for 96 hours and any loss in coating adhesion recorded. In the water bath test, a piston having a polymer coating is submerged in high temperature water for a test-defined period of time. An appropriate pressure sensitive tape is then applied to the polymer and a minimum adhesive strength measured to determine a delamination resistance of the polymer coating (ASTM D-1000, Method A). In the oil impingement test, a high temperature oil jet is directed at the surface of the piston having a polymer coating. As with the water bath test, a pressure sensitive tape is then applied to the polymer coating to test for any delamination.

High frequency reciprocating tribology rigs (HFRR) for assessing the durability of moving parts, such as pistons, are also known in the art. Such test methods and equipment measure lubricity, or an ability of a fluid to affect friction between two surfaces. Wear to surfaces in relative motion under a load is also measured. Equipment used to perform such tests is manufactured, for example, by Imperial Scientific Industries.

An additional piston test has been reported by Slone in U.S. Pat. No. 5,007,284 and relates to a wear simulator for piston rings and cylinder liners. The wear simulator develops data on friction forces, wear, and friction coefficients based upon different speeds, loads, materials, temperatures, and lubricants.

There is a continuing need for a testing apparatus and method that more accurately represents the chemical and mechanical strain on the polymer skirt coating of the piston during engine operation. Desirably, the apparatus and method provide a more accurate prediction of piston delamination resistance.

SUMMARY OF THE INVENTION

In concordance with the instant disclosure, a testing apparatus and method for measuring the delamination resistance of a polymer-coated piston that more accurately represents the conditions occurring during typical engine operation is surprisingly discovered.

In one embodiment, a piston testing apparatus is described including a housing with an inner wall that defines a cavity therethrough, and a piston disposed in the housing cavity and having a polymer coating deposited thereon. The polymer coating of the piston contacts the housing inner wall. The piston testing apparatus further includes an actuating means operatively coupled to the piston. The actuating means is configured to provide a reciprocating movement of the piston through the cavity.

In another embodiment, an injection system for a piston testing apparatus is described and includes a cover plate and an injector in communication with a plurality of injector channels. The injector channels are disposed in the cover plate and the injector is configured to deliver a fluid through the injector channels to the inner wall of the housing.

A method is also described that includes providing a piston having a polymer coating deposited thereon, wherein the polymer coating contacts a surface disposed adjacent to the piston, and a thermal stress, a frictional stress, and a chemical stress are applied to the piston.

DRAWINGS

The above, as well as other advantages of the present disclosure, will become readily apparent to those skilled in the art from the following detailed description, particularly when considered in the light of the drawings described hereafter.

FIG. 3 illustrates a schematic side elevational view of an injector plate depicted in FIG. 1; and FIG. 4 shows a schematic bottom plan view of the injector plate depicted in FIGS. 1 and 3.

DETAILED DESCRIPTION OF THE INVENTION

Figure 1:
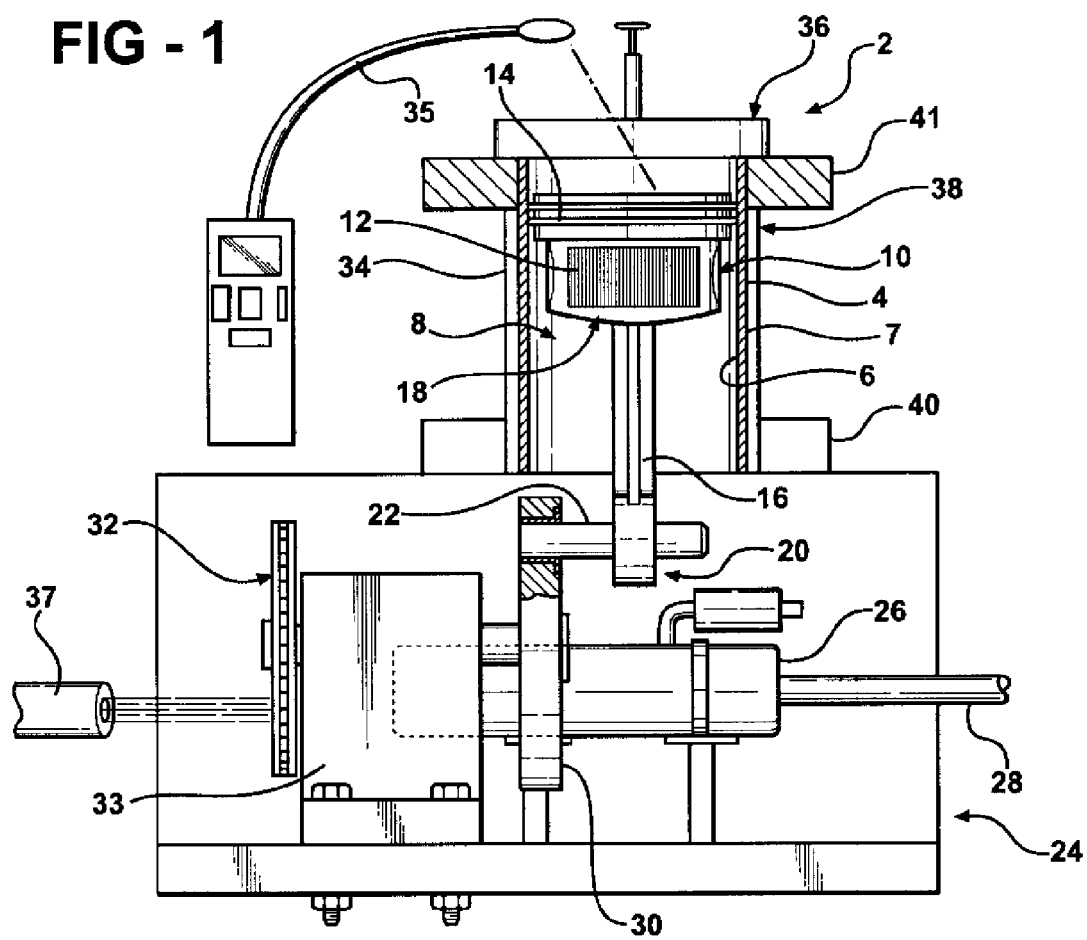
FIG. 1 illustrates a schematic side view of a piston testing apparatus.

The following description is merely exemplary in nature and is not intended to limit the present disclosure, application, or uses. It should also be understood that throughout the drawings, corresponding reference numerals indicate like or corresponding parts and features. In respect of the method disclosed, the steps presented are exemplary in nature, and thus, are not necessary or critical.

Figure 2:
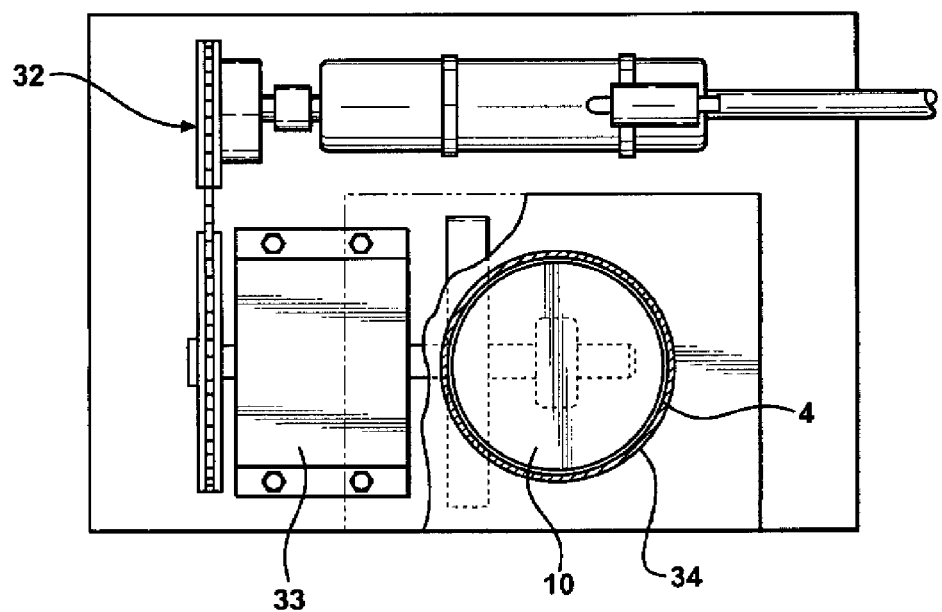
FIG. 2 shows a schematic top plan view of a piston testing apparatus.

As depicted in FIGS. 1 and 2, a piston testing apparatus 2 of the present disclosure includes a housing 4. The housing 4 has an inner wall 6 and an outer wall 7. A cavity 8 is formed by the inner wall 6. The piston testing apparatus 2 further includes a piston 10 disposed in the cavity 8. As a nonlimiting example, the housing 4 with the cavity 8 can include a piston cylinder having a bore formed therein. Other housings suitable for confining the piston 10 can also be used.

The piston 10 of the present invention has a polymer coating 12 deposited thereon. The polymer coating 12 is caused to contact the inner wall 6 of the housing 4, for example by being slidably engaged with the inner wall 6. The polymer coating 12 can include, for example, one or more polyamide resins, polyimide resins, epoxy resins, graphite and molybdenum disulfide coatings. In one embodiment, the polymer coating is a graphite coating.

Suitable polymer coatings 12 can be applied in the form of an anti-friction slurry having one or more solvents, such as n-methylpyrollidone, diethylene glycol monobutyl ether, and cyclohexanone, for example. Slurries are commercially available, as nonlimiting examples, from Dow Corning Corporation under the trade name Molykote® coating and from Sandstrom Products Company as Piston Skirt Coating Series E724™, and are generally designed to provide minimal friction characteristics, corrosion resistance, and extended wear life.

Typically, the polymer coating 12 can be applied to the piston 10 following a surface cleaning to ensure an adhesion of the polymer coating 12 to the piston 10. The cleaning can be effected with a hot alkaline wash, a deionized water rinser and a hot air blow off, for example. An adhesion-promoting precoat, for example, with a zinc phosphate solution, can also be used. The polymer coating 12 of the piston 10 can be performed by a variety of means, including a spraying or a screen-printing of the polymer coating 12 slurry onto the piston 10. In a particular embodiment, the polymer coating 12 is applied using the screen-printing method. A thickness of the polymer coating 12 is generally from about 5 microns to about 50 microns, and in particular embodiments from about 5 microns to about 25 microns. It should be understood that other thicknesses can be used as desired.

One of ordinary skill in the art should further appreciate that the piston 10 can include one or more rings 14. The rings 14 are typically adapted to be disposed in a groove (not shown) formed on an outer wall of the piston 10. The ring 14 can be, for example, a compression ring. However, any ring 14 suitable for forming a substantially fluid tight seal with the inner wall 6 of the housing 4 can be used.

The piston testing apparatus 2 further includes a reciprocating means 16, for example, a connecting rod, which is coupled to the piston 10 at a first end 18 of the reciprocating means 16. In certain embodiments, the piston 10 is coupled to the reciprocating means 16 with one or more pins (not shown) that facilitate a second end 20 of the reciprocating means 16 to have some lateral movement relative to the piston 10. The second end 20 is coupled to an actuating means 24, illustratively with one or more pins (not shown). The actuating means 24 is adapted to impart a reciprocating or an "up and down" movement of the piston 10 within the cavity 8. As a nonlimiting example, the second end 20 of the reciprocating means 16 includes a lower pin bushing (not shown) coupled to a piston drive pin 22. The piston drive pin 22 is connected to a crankshaft (not shown) that causes the reciprocating movement.

In one particular embodiment, the polymer coating 12 of the present invention can include one or more polymer skirts that are configured to alternately contact the inner wall 6 with the reciprocating movement of the piston. Illustratively, the polymer coating 12 includes two polymer skirts that alternately contact the inner wall 6 during a side loading thereof.

In a further embodiment, the one or more pins that facilitate a coupling of the second end 20 of the reciprocating means 16 to the actuating means allow for a collective removal of the reciprocating means 16 and the piston 10. Thus, the piston 10 can be efficiently removed following a testing thereof. Also, an employment of the reciprocating means 16 coupled to the piston 10 of the present invention facilitates an ease in interchange and teardown after each test.

It should be appreciated that the actuating means 24 can include any means suitable for driving the piston 10 in a reciprocating motion within the cavity 8 of the housing 4. As illustrated in FIGS. 1 and 2, the actuating means 24 includes an air driven motor 26 in communication with an air supply line 28. In a particular embodiment, the air driven motor 26 is disposed inside the actuating means 24 and further provides a cooling effect to the internal components of the piston testing apparatus 2, e.g., the pins and reciprocating means.

The air driven motor 26 can be coupled to a crankshaft throw and counter balance 30. When coupled with the reciprocating means 16, the crankshaft throw and counter balance 30 causes the reciprocating movement of the piston 10. The crankshaft throw and counter balance 30 can be removably interchangeable. The actuating means 24 further includes a drive chain and sprocket 32 adapted to modify a frequency or reciprocation rate (related to an RPM of the drive chain and sprocket 32) of the piston 10 within the cavity 8. The drive chain and sprocket 32 is operatively coupled to a crankshaft support block 33, for example. The piston testing apparatus 2 can include a rate sensor 37, for example a tachometer, which may be disposed adjacent to the drive chain and sprocket 32. The rate sensor 37 is configured for measuring a rotation frequency caused by the actuating means, thereby monitoring the frequency of the reciprocating piston movement.

The piston testing apparatus 2 of the present disclosure also includes a heating means 34 configured to apply a thermal energy to the housing 4 which is transferred to the piston 10. Such a heating means 34 can include, as a nonlimiting example, a thermal blanket that is disposed adjacent to the outer surface 7 of the housing 4. A temperature of the piston 10 is typically chosen to simulate an operating temperature range of the piston 10 in a desired use such as an internal combustion engine, for example. In one embodiment, the heating means 34 provides a piston temperature of up to about 200° F. It should be recognized that alternative heating means 34 and operating temperatures can be used as desired. Additionally, the piston testing apparatus 2 can include a thermocouple (not shown) or a temperature sensor 35 for monitoring a temperature of the piston testing apparatus 2.

To further simulate a set of conditions experienced by the piston 10 during engine operation, the piston testing apparatus 2 includes an injection system 36. The injection system 36 is adapted to inject a fluid into the cavity 8 of the housing 4. The injection plate 36 can be disposed adjacent to a first end 38 of the housing 4. In the embodiment shown, the injection system 36 is disposed on a housing hold-down plate 41 which is disposed on the first end 38 of the housing 4. It should be appreciated that the hold-down plate 41, as well as the base plate 40, can be formed from an insulating material such as a composite material, for example. The insulating material militates against an overheating of the piston testing apparatus 2 when the housing 4 is heated.

As depicted in FIGS. 3 and 4, the injection system 36 includes a cover plate 200 having a first lip 201 that is configured to fit within the top plate 41. The cover plate 200 further includes one or more injector channels 202 formed in the cover plate 200. The injector channels 202 can terminate at one or more ports 203 disposed on second lip 204. The second lip 204 is disposed radially inward from the first lip 202, and is configured to form a space between the ports 203 and the inner wall 6. The injector channels 202 are in communication with an injection means 204, for example, a syringe injector. The injection means 204 is configured to deliver a fluid through the injector channels 202 to the inner wall 6. Alternative suitable injection means 204, such as automated and mechanical injection devices for example, can be used as desired.

In a particular embodiment, a plurality of the injector channels 202 are configured to deliver a fluid in the form of a spray to the inner wall 6 of the housing 4. It should be recognized that the fluid spray on the inner wall 6 should be substantially evenly distributed, thereby exposing a maximum area of the polymer coating 12 to the fluid. To facilitate the substantially even distribution of the spray, the injector channels 202 have a diameter that provides fine droplets of the fluid for injection into the cavity 8 and onto the inner wall 6 at a desired injection pressure As a nonlimiting example, the injector channels 202 have an inner diameter of less than about 0.125 inches. In a particularly illustrative embodiment, the injector channels 202 have an inner diameter of less than about 0.0625 inches. The injection channels 202 can also be arranged through the cover plate 200 to direct the spray in multiple directions, for example, in a circular or semi-circular pattern, and facilitate the substantially even distribution of the spray.

The cover plate 200 of the disclosure may be substantially transparent to allow a visual observation of the contents of the cavity 8 during operation of the piston testing apparatus 2. The cover plate 200 can be formed from any conventional transparent material suitable for use at expected operating temperatures. As examples, suitable transparent materials can include glass and plastic. Illustratively, the cover plate can be formed from a transparent acrylic plastic such as polymethyl methacrylate (PMMA), sold commercially under the trade name Plexiglass® from Rohm & Haas Company. Polycarbonate plastics can also be used, for example. The transparent cover plate 200 allows an operator of the piston testing apparatus 2 to observe a quality of the spray application injected into the cavity 8. Also, the transparent cover plate 200 can allow the operator to observe any delamination of the polymer coating 12 as the piston 10 is being tested.

With renewed reference to FIGS. 1 and 2, the housing 4 of the present disclosure can be interchanged to allow for testing of pistons 10 of varying dimensions. In one embodiment, the piston testing apparatus 2 includes a base plate 40 disposed on the actuating means 24 and configured to removably receive the housing 4. Removal of the housing 4 also allows for an ease in cleaning the cavity 8 prior to testing the next piston 10.

The present invention further includes a method for testing the piston 10. The method includes the step of providing the piston 10 having the polymer coating 12 deposited thereon. The polymer coating 12 contacts a surface, for example the inner wall B of the housing 4, disposed adjacent to the piston 10. A number of environmental stresses including thermal stress, a frictional stress, and a chemical stress from exposure to the liquid fuel, for example, are then applied to the piston 10. During or subsequent to the application of the stresses, the piston 10 is examined for a delamination of the polymer coating 12. In one embodiment, the piston 10 can be tested under the stresses at a desired reciprocation rate and for a desire period of time to simulate engine "idle" conditions or "highway" conditions, for example. Subsequently, the piston 10 can be removed and analyzed. The analysis may include examination of the piston 10 under a light with magnification to determine whether any bubbling or a delamination of the polymer coating 12 has occurred. Other means for analyzing the polymer coating 12 for delamination and related incipients can also be used.

Each of the thermal stress, the frictional stress, and the chemical stress can be chosen to simulate a desired set of operating conditions for a desired type of the piston 10 or type of engine. For example, the thermal stress can be applied to raise the temperature of the piston 10 to the typical operating temperature for an automobile engine of about 200° F. It should also be understood that the reciprocating movement of the piston 10 relative to the adjacent surface can provide the frictional stress of the described method. For example, the reciprocating movement can be actuated at a rate of about 300 Hz to about 1000 Hz, and in particular embodiments about 500 Hz to simulate the friction during normal engine operation. The application of a liquid fuel for simulation of chemical stresses on the piston 10, can include an injection of an oil/fuel mixture, wherein the fuel is a petroleum fuel such as gasoline, diesel or biofuels and the oil is present in a amount from about 1% to about 3% by total weight of the mixture. In a particular embodiment, the amount of oil in the liquid fuel is about 2% by weight, thus simulating a ratio of fuel to oil experienced by the piston 10 due to expected blow-by in normal vehicular operation. Typically, the liquid fuel has a flash temperature higher than the operating temperature of the piston 10, for example greater than about 300° F.

In one embodiment of the present method, the liquid fuel is sprayed substantially evenly onto the inner surface 6 which the polymer coating 12 of the piston 10 contacts. Thus, a total area of the polymer coating 12 being exposed to the liquid fuel mixture can be maximized.

The thermal stress, the frictional stress, and the chemical stress can be applied to the piston 10 simultaneously, or in any order or combination as desired. In one particular embodiment, the thermal stress is applied to the piston 10, for example with the thermal blanket 34, to a desired temperature prior to initiating the reciprocating movement of the piston 10. As a nonlimiting example, the operating temperature can be about 200° F., and the reciprocating movement can occur at a frequency of about 500 Hz for a time of about 5 minutes prior to removing the piston 10 and inspecting the piston 10 and polymer coating 12 for delamination or other damage to the polymer coating 12.

In one particular embodiment of the present disclosure, the housing 4 is surrounded by the thermal blanket 34 and the temperature sensor 35 to selectively control the temperature of the polymer-coated piston 10 during the test. The piston rings 14 are placed on the polymer-coated piston 10, and the reciprocating means 16 is coupled to the piston 10 with the pin. The assembled piston 10 and reciprocating means 16 are placed in the cavity 8 at a top dead-center position. The second end 20 of the reciprocating means 16 is coupled to the crankshaft throw and balance 30, for example with a lower pin bushing. The temperature of the piston 10 is raised to about 200° F. prior to actuating the reciprocating movement of the piston 10. A liquid fuel mixture having about 2% of an oil and about 98% of a petroleum fuel by total weight of the mixture is injected into the cavity 8. The liquid fuel is injected to form a substantially even distribution over the inner wall 6 of the housing 4. The reciprocating movement of the piston 10 is then actuated by operation of the air driven motor 26 coupled with the crankshaft throw and balance 30. It is desirable for total travel distance of the polymer-coated piston 10 to correspond to a true travel distance of the piston 10 during engine operation. In a typical internal combustion engine, the travel distance is about 3 inches, however other travel distances can be used. The reciprocating movement causes the polymer coating 12 of the piston 10 to slidably contact the lubricated inner wall 6, thereby creating friction. Thus, the testing apparatus 2 can simulate the thermal, frictional, and chemical stresses typically observed under typical engine operating conditions. Following testing for a desired time and at a desire frequency, the piston 10 is removed from of the cavity 8 and inspected. The inspection may include inspection under a light with a microscope to determine if any bubbling or delamination of the polymer coating 12 has occurred. In particular embodiments, a delamination at an edge or a crown of the polymer skirts is inspected for. Also after the piston 10 is removed, the cavity 8 can be cleaned and/or a different housing 4 installed for further testing of the same or different piston 10.

One of ordinary skill in the art should appreciate that the testing apparatus 2 and the method of the present disclosure maximize an accuracy of the operating conditions experienced by the piston 10 during normal engine operation. In particular, the testing apparatus 2 and the method advantageously expose the piston 10 to variables including the reciprocating movement (i.e. the frictional stress) and fuel contamination (i.e. the liquid fuel mixture) in addition to conventional operating temperatures and pressures. It has surprisingly been found that accounting for these additional variables provides a more accurate prediction of delamination resistance of a particular polymer coating 12 on a particular piston 10. The testing apparatus 2 and method of the invention provide a unique application of the thermal, mechanical, and chemical stresses to the polymer coated piston 10, and better simulate piston 10 engine operating conditions in comparison to conventional piston tests.

While certain representative embodiments and details have been shown for purposes of illustrating the invention, it will be apparent to those skilled in the art that various changes may be made without departing from the scope of the disclosure, which is further described in the following appended claims.

What is claimed is:

1. A piston testing apparatus comprising:
   a housing having an inner wall and defining a cavity therethrough;
   a piston disposed in the cavity, the piston having a polymer coating deposited thereon, wherein the polymer coating of the piston contacts the inner wall of the housing; and
   an actuating means operatively coupled to the piston and configured to provide a reciprocating movement of the piston through the cavity, the actuating means including a motor that drives the reciprocating movement of the piston, wherein the piston is tested under an environmental stress.

2. The piston testing apparatus of claim 1, further including a reciprocating means disposed between the actuating means and the piston.

3. The piston testing apparatus of claim 1 further comprising an injection plate disposed on the housing and adapted to inject a fluid into the cavity.

4. The piston testing apparatus of claim 1, further comprising a heating means adapted to apply a thermal stress to the piston, the heating means disposed adjacent an outer surface of the housing.

5. The piston testing apparatus of claim 1, further comprising a temperature sensor configured to measure the temperature of the inner wall of the housing.

6. The piston testing apparatus of claim 1, further comprising a rate sensor configured to measure a rate of the reciprocating movement of the piston.

7. The piston testing apparatus of claim 1, wherein the motor of the actuating means is an air driven motor in fluid communication with an air supply, the actuating means further including
   a crankshaft coupled to the air driven motor,
   a crankshaft throw and balance coupled to the crankshaft, and
   a piston drive pin coupled to the crankshaft throw and balance and to a
   connecting rod, the connecting rod coupled to the piston, wherein the air driven motor drives the reciprocating movement of the piston.

8. The piston testing apparatus of claim 1, wherein the housing is removably coupled to the actuating means, wherein the housing is interchangeable with an other housing configured to receive an other piston for testing thereof.

9. A piston testing apparatus comprising:
   a housing having an inner wall and defining a cavity therethrough;
   a piston disposed in the cavity, the piston having a polymer coating deposited thereon, wherein the polymer coating of the piston contacts the inner wall of the housing;
   an actuating means operatively coupled to the piston and configured to provide a reciprocating movement of the piston through the cavity, the actuating means including a motor that drives the reciprocating movement of the piston; and
   an injection system including a cover plate disposed adjacent the housing and having a plurality of injector channels disposed through the cover plate, and an injector in communication with the injector channels and adapted to deliver a fluid therethrough to the inner wall of the housing, wherein the piston is tested under an environmental stress.

10. The piston testing apparatus of claim 9, wherein the injector and the injector channels are configured to deliver a substantially evenly distributed spray of the fluid onto the inner wall of the housing.

11. The piston testing apparatus of claim 9, wherein the injector channels have a diameter of less than about 0.0625 inches.

12. The piston testing apparatus of claim 9, wherein the cover plate is clear and transparent.

13. The piston testing apparatus of claim 12, wherein the cover plate is formed from an acrylic plastic.

14. A piston testing apparatus comprising:
   a housing having an inner wall and defining a cavity therethrough;
   a piston disposed in the cavity, the piston having a polymer coating deposited thereon, wherein the polymer coating of the piston contacts the inner wall of the housing;
   an actuating means operatively coupled to the piston and configured to provide a reciprocating movement of the piston through the cavity, the actuating means including a motor that drives the reciprocating movement of the piston to apply a mechanical stress to the piston;
   a heating means adapted to apply a thermal stress to the piston, the heating means disposed adjacent an outer surface of the housing; and
   an injection system including a cover plate disposed adjacent the housing and having a plurality of injector channels disposed therethrough, and an injector in communication with the injector channels and adapted to deliver a fluid therethrough to the inner wall of the housing to apply a chemical stress to the piston, wherein the piston is tested under at least one of the mechanical stress, the thermal stress, and the chemical stress.

* * * * *